Dec. 22, 1970 C. C. HACH 3,549,261
COLORIMETER APPARATUS

Filed March 16, 1965 2 Sheets-Sheet 1

INVENTOR.
Clifford C. Hach,
BY
Wolfe, Hubbard, Voit & Osann
Attorneys.

United States Patent Office 3,549,261
Patented Dec. 22, 1970

3,549,261
COLORIMETER APPARATUS
Clifford C. Hach, Box 907, Ames, Iowa 50010
Filed Mar. 16, 1965, Ser. No. 440,151
Int. Cl. G01j 3/46, 3/48
U.S. Cl. 356—180                                    4 Claims

ABSTRACT OF THE DISCLOSURE

A dual beam photocell colorimeter having a pair of light-responsive electrical transducers arranged in parallel, with a series-connected electrical meter, is provided with means for adjusting the amount of light received by both transducers, and with a means for entirely preventing light from passing to one of the transducers. A sample-receiving zone is positioned in a light path from a source of light to the transducer having the positionable means. By regulation of the foregoing adjustments, the electrical meter is standardized for a reading corresponding to complete light absorption by a sample, and for a reading corresponding to no light absorption by a sample. The resulting meter readings are thus linear with light absorption. Components are protected against spillage of liquids and against electrical and optical aberrations by hermetically sealing the optical components.

---

This invention relates to colorimeters of the photoelectric type, and more particularly concerns improvements in such colorimeters whereby difficulties in the construction, standardization, and use of photoelectric colorimeters are substantially remedied.

Conventional photocell colorimeters operate on the principle of passing a beam of light through a sample and then to a light-responsive electrical transducer to measure attenuation of the light beam caused by light absorption of the sample. An electrical meter is placed in circuit with the light-responsive transducer to indicate the amount of light absorbed, and this can be related to the concentration of a color-forming or color-bleaching substance through a logarithmic equation known as Beer's law.

All photocell colorimeters operate according to the above principle, and virtually all are subject to similar problems and limitations.

A serious difficulty with photocell colorimeters results from the fact that most samples are liquids, and should there be any spillage the liquid can enter the colorimeter where it coats optical surfaces and corrodes metallic components. An important object of the invention is to provide a colorimeter apparatus which is immune from problems caused by sample spillage.

An associated difficulty is condensation of water vapor within the colorimeter and especially on the walls of the sample cell. At the very least this causes a drift in zero reading as it introduces an uncontrolled light attenuation. Accordingly a related object is to provide a colorimeter free from electrical or optical aberrations produced by condensation on optical surfaces.

An inherent difficulty with photocell colorimeters is the need to provide a means for accurately standardizing the instrument before and during use. Consistent with this requirement is one that the standardization apparatus and method not be unduly complex. Another object of the invention is to provide a colorimeter which can be standardized readily, and which does not require elaborate standardization components or circuitry.

A further object of the invention is to provide a colorimeter that can readily be standardized for readings corresponding to no light absorption by a sample and for readings corresponding to complete light absorption, corresponding to zero and full range meter readings.

Another important requirement of photocell or photoelectric-type colorimeters is that their electrical output or meter reading be as closely linear as possible with the amount of light absorption by the sample; only when this condition is met can Beer's law be used to relate light absorption with concentration. It is thus another objective of the invention to provide a colorimeter in which the output is related substantially linearly to light absorption.

Other and further objects and advantages of the invention will become apparent as its description proceeds in the ensuing specification, which is to be read in conjunction with the attached drawings wherein.

Figure 1:
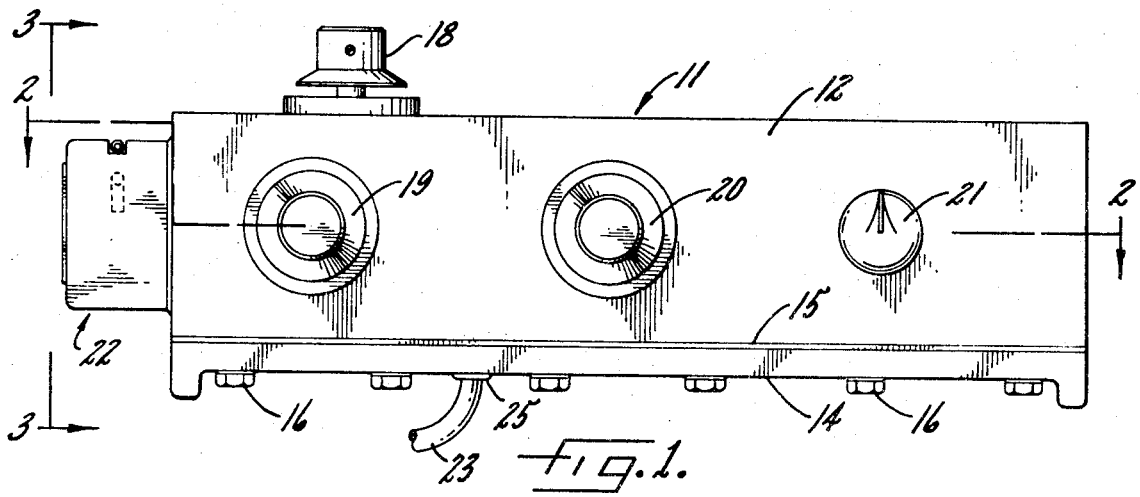
FIG. 1 is an external elevation view of the colorimeter apparatus of the invention.

Turning first to FIG. 1, the preferred form of the inventive colorimeter 11 is contained in a small oblong cast aluminum alloy container 12, which is hermetically sealed by a mating cast aluminum alloy base 14. A resilient fluid impervious gasket 15 is disposed between container 12 and base 14 and is compressed into hermetic sealing relationship between container 12 and its base 14 by a series of equally spaced bolts 16 passing through holes in the periphery of base 14 and into threaded bolt-receiving holes in container 12.

Four knobs appear in the view shown on FIG. 1 and will here be identified only for reference. Their functions are best described in conjunction with FIG. 2, discussed below.

On the top of container 12 a positionable shutter knob 18 is located, and along the front of container 12 are shutter knobs 19 and 20 employed to standardize the apparatus when no sample is within the sample-receiving cell or cuvette 22, and range adjustment knob 21.

To the left of FIG. 1 a sample-containing cell 22 is mounted in hermetically sealed and light-transmissive relationship to container 12. The details and function of cell 22 are likewise best reserved for discussion in FIG. 2.

Extending from the bottom of container 12 through base 14 is an insulated electric cable 23 which extends to suitable power sources and to an external galvanometer for reading the electrical output of the light-responsive transducers. Electrical cable 23 is maintained in hermetically sealed relationship with container 12 by a flexible rubber grommet 25.

Figure 2:
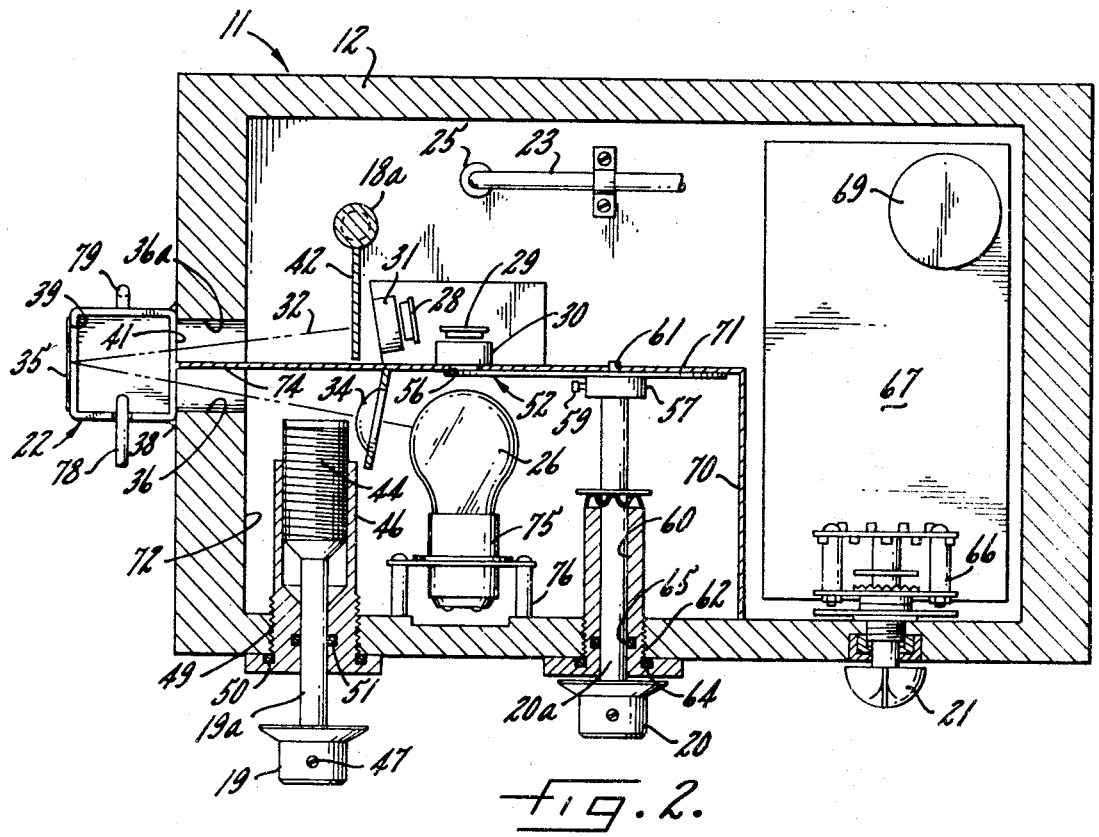
FIG. 2 is a top sectional view taken at plane 2—2 of FIG. 1 and shows the interior of the apparatus of FIG. 1 and of the present invention.

Turning now to FIG. 2, a top sectional view of the inventive apparatus is shown in a schematic representation. In this view it will be observed that light bulb 26 serves as the light source for a pair of light-responsive electrical transducers 28 and 29.

In the preferred form of the invention transducers 28 and 29 are photoresistive elements, that, is electrical resistors whose resistance value is highly dependent on the amount of light being received by the element. With photoresistive elements such as cadmium sulfide the dark resistance will ordinarily be many orders of magnitude greater than their resistance under daylight conditions. Thus such elements provide ideal transducers to convert the amount of light received to a corresponding electrical signal.

Light from bulb 26 passes directly to transducer 29 through a filter 30, which is so colored that it transmits light of substantially only one wave length to transducer 29, absorbing all other wave lengths. A similar filter 31 is disposed in the optical path 32 from bulb 26 to transducer 28, where it similarly functions to absorb all wave lengths but those in one relatively narrow band. As those skilled in the art will appreciate, light absorptive filters are used for precise colorimetric measurement for the reason that Beer's law holds true only for essentially monochromatic light.

Optical path 32 associated with bulb 26 and transducer 28 is defined by condensing lens 34, reflective surface 35 on the external portion of cell 22, and transducer 28. Thus, light from bulb 26 is focused by lens 34 and then passes through aperture 36 in container 12 to cell 22. Cell 22 is, of course, made of a transparent material such as glass or a transparent organic plastic, which is sealed to container 12 by an epoxy or similar permanent adhesive material 38.

Light entering cell 22 passes once through the width of the cell and then, after being reflected from a reflective material 35 disposed on the outside of cell 22, once-again passes through the cell and through aperture 36a to filter 31 and transducer 28.

From the description thus far it will be appreciated that sample spillage and liquid condensation cannot interfere with the operation of apparatus 11. Inasmuch as container 12 is completely sealed it is not possible for any liquid or vapor to enter the interior of container 12 and, for the reason that no vapor can condense on the optical surfaces 39 and 41 of cell 22 this problem is similarly eliminated.

Turning once again to FIG. 2, shaft 18a (of shutter knob 18 (FIG. 1) extends inwardly through a hermetic seal, not shown, and is connected to shutter 42 in optical path 32. Shutter 42 is advantageously coated or surfaced with a matte light-absorbing material such as black velvet, and is pivotable from a closed position adjacent filter 31 to an opened position by rotating knob 18 (FIG. 2) a quarter turn clockwise.

Adjustable shutter mechanisms are provided for each of transducers 28 and 29 so that the light reaching each transducer from bulb 26 may be carefully adjusted. The adjustable shutter for transducer 28 is here shown as an incrementally advanceable screw 44 threadably received in nut 46 mounted to container 12, and which is moved inwardly or outwardly by rotation of shutter knob 19. As shown in the drawing, knob 19 is pinned to shaft 19a via set screw 47; shaft 19a advantageously is made integral with screw 44 to provide rigid coupling of the two.

To provide hermetic sealing for the screw shutter 44, shaft 19a, and associated mechanisms, nut 46 is threaded into container 12 at threaded aperture 49; an O-ring 50 provides further assurance of hermetic sealing. Similarly, O-ring 51 extending peripherally around shaft 19a and disposed in a recess within nut 46 insures hermetic sealing of shaft 19a notwithstanding rotational and longitudinal movement of the shaft.

Figure 4:
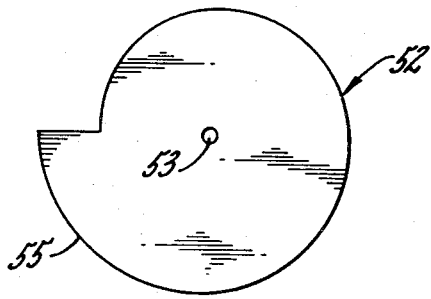
FIG. 4 is the spiral shutter used to adjust the amount of light received by one of the light-responsive electrical transducers in the apparatus of FIGS. 1 and 2.

Adjustment of the amount of light passing from bulb 26 to transducer 29 is effected with a rotatable spiral shutter 52, best shown in FIG. 4. Spiral shutter 52 is made of opaque matte-surfaced material and is fully rotatable about a central hole 53. The maximum radius of spiral edge 55 is made sufficiently large that it completely obscures aperture 56 leading to transducer 29 (FIG. 2), while the minimal radius of spiral surface 55 is sufficiently small that aperture 56 (FIG. 2) is completely exposed when spiral shutter 52 is in its fully open position.

Adverting to FIG. 2, spiral shutter 52 is shown provided with an integral collar 57 secured to shaft 20a via set screw 59. The assembly of shutter 52, collar 57, set screw 59, shaft 20a, and shutter knob 20 is journaled in sleeve 60 and hole 61. Sleeve 60, as shown in FIG. 2, is threadably received into a threaded hole 62 in container 12, and hermetic sealing of sleeve 60 is provided via O-ring 64 while a similar O-ring 65 assures hermetic sealing of shaft 20a.

The remaining knob 21 which extends external of container 12 is a range selector switch used in conjunction with an electrical meter employed to indicate the electrical output of transducers 28 and 29; the associated selector switch 66 is of conventional design, and is wired into electrical circuit board 67 where a plurality of fixed electrical resistors is provided to afford the desired meter ranges.

Continuing the description of hardware shown in FIG. 2, a container 69 filled with a desiccant and water vapor absorbent is advantageously provided within container 12. The desiccant in container 69 may be any of the materials capable of absorbing potentially harmful and corrosive vapors of water and other chemicals, and may, for example, be such materials as magnesium perchlorate, silica or alumina gel, adsorbent charcoal, calcium chloride, or the like. Since the container 12 is air and vapor tight, it is usually necessary to replace desiccant in container 69 unless base 14 of container 12 is removed for inspection or repair.

An internal light-tight chamber is defined by panels 70 and 71 and serves to segregate light from bulb 26 from direct contact with transducer 28. Panels 70 and 71 extend from the top to the bottom of container 11, with panel 70 extending rearwardly of the front surface of container 12 and panel 71 extending parallel to the front surface from its intersection with panel 70 until wall 72 of container 12. An extension of panel 71, tab 74, extends into aperture 36 where it abuts against optical surface 41 of cell 22.

As also shown in FIG. 2, light bulb 26 is positioned in socket 75 which is mounted onto container 12 via mounting studs 76.

Figure 3:
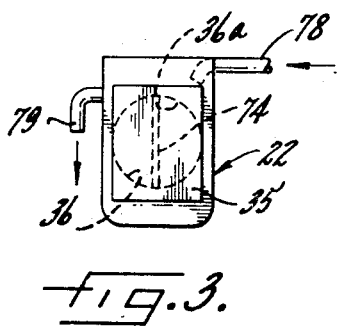
FIG. 3 is a view taken along plane 3—3 of FIG. 1 and showing a side view of the sample cell used with the apparatus of FIGS. 1 and 2.

Turning attention now to FIG. 3, an end view of sample-containing cell 22 is shown. In the embodiment here depicted sample cell 22 is used as a continuous flow cuvette, and accordingly a sample inlet conduit 78 extends from a stream or material to be sampled, via a pump (not shown), to cell 22. Sample liquid is discharged from cell 22 via overflow conduit 79. In this embodiment the top of cell 22 is open to facilitate cleaning of its interior surfaces.

Figure 5:
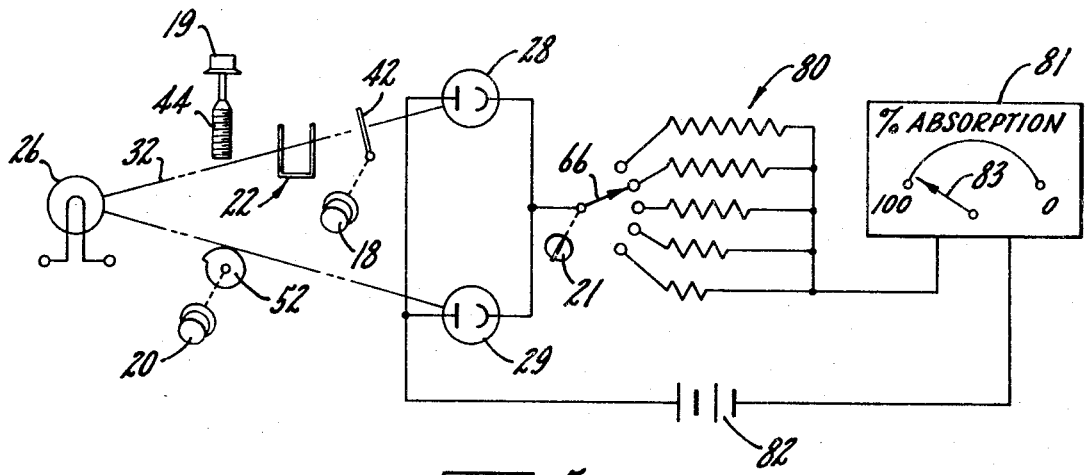
FIG. 5 is a schematic electrical circuit for use with the apparatus of the invention.

Referring to FIG. 5, an electrical circuit suitable for use with the present invention is schematically depicted. Alternating current is supplied to bulb 26 (via electrical conduit or cable 23 in FIG. 1 or 2), and light is passed directly to transducer 29 and indirectly (through sample cell 22) to transducer 28, both being light-responsive electrical resistance elements disposed in parallel circuit, and in a series circuit with range selecting resistances 80, galvanometer 81, and D.C. source 82. In the preferred embodiment of the invention both D.C. source 82 and galvanometer 81 are located outside of container 12 (FIGS. 1 and 2).

For convenient reference, spiral shutter 52 and screw shutter 44 associated respectively with transducers 29 and 28, and positionable shutter 42 associated with transducer 28, are included in FIG. 5.

To operate the apparatus of the invention, sample-containing cell 22 is emptied of any sample and current is supplied to bulb 26 and from D.C. source 82. With adjustable shutters 44 and 52 fully open and positionable shutter 42 in its open position, range selector knob 21 is used to select the lowest range of resistor 80 that will give full scale deflection of meter 81.

Meter 81 is then adjusted for a zero reading corresponding to complete light absorption by a sample. To accomplish this, positionable shutter 42 is closed completely, and spiral shutter 52 is adjusted (by knob 20 of FIG. 1 or 2) until pointer 83 exactly reads zero on meter 81.

Positionable shutter 42 is then returned from its temporarily closed position to a fully open position.

Next, meter 81 is adjusted to correspond to full scale deflection (the zero position on meter 81) corresponding to no light absorption by a sample. First, either with no sample in cell 22 or with a completely colorless liquid therein—this latter procedure is preferred—screw shutter 44 is adjusted via shutter knob 19 to the meter reading corresponding to zero absorption.

Meter 81, and consequently the complete apparatus 11, is now fully standardized and is ready to receive and colorimetrically analyze a sample. When said sample is placed in cell 22 it absorbs a portion of the light in optical path 32 passing from bulb 26 through cell 22 and into transducer 28 dependent on the concentration of a colored reagent in the sample. This absorption is read directly on meter 81. By previous calibration with samples of known concentration, meter readings from meter 81 can be related directly to concentration in a sample.

While the invention has been described in conjunction with a specific embodiment thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim as my invention:

1. A colorimeter apparatus comprising:
a light source,
a first light-responsive electrical transducer to receive light from said source,
means for containing a sample,
a second light-responsive electrical transducer to receive light from said source passing through said sample-containing means, said first and second transducers being connected in parallel with each other,
an electrical meter in circuit with said transducers for indicating the amount of light absorbed by said sample, said meter being connected in series with both of said transducers,
positionable means for preventing light from said source from passing to said second transducer,
means for adjusting the amount of light received by said first transducer when said positionable light-preventing means is in position to thereby standardize the electrical meter for a reading corresponding to complete light absorption by a sample,
and means for adjusting the amount of light received by said second transducer when said light-preventing means is out of position and no sample is in said sample-containing means to thereby standardize the meter for a reading corresponding to no light absorption by a sample.

2. The colorimeter apparatus of claim 1 wherein said light-responsive electrical transducers are light-responsive electrical resistance elements.

3. The colorimeter apparatus of claim 1 including a housing comprising a hermetically sealed container for all the aforesaid elements except said electrical meter and said sample-containing means, said sample-containing means being positioned external of said container and in hermetically sealed light-transmissive relationship therewith, and a reflective surface positioned on said sample-containing means to permit light from said source in said container to pass through said sample and be reflected back through said sample to said second transducer in said container.

4. The colorimeter apparatus of claim 1 including a housing comprising a hermetically sealed container for all the aforesaid elements except said electrical meter and said sample-containing means, and control elements for said positionable light-preventing means and for both said light adjusting means passing in hermetically sealed relation through said housing so that the colorimeter is normally usable without opening the housing.

References Cited

UNITED STATES PATENTS

| | | | |
|---|---|---|---|
| 2,263,938 | 11/1941 | West | 88—14CNC4 |
| 2,630,735 | 3/1953 | Rouy | 88—14CNC5 |
| 2,774,276 | 12/1956 | Glasser et al. | 88—14CNC3 |
| 2,856,811 | 10/1958 | Kaye | 88—14CNC5 |
| 2,964,640 | 12/1960 | Wippler | 88—14SIX |
| 3,028,499 | 4/1962 | Farrall | 250—209 |
| 3,033,036 | 5/1962 | Leisey | 88—14SIX |
| 3,049,050 | 8/1962 | Thomas | 88—23G |
| 3,141,094 | 7/1964 | Strickler | 250—218 |
| 3,164,663 | 1/1965 | Gale | 88—14CNC2 |
| 3,295,406 | 1/1967 | Smith | 88—14CNC1 |
| 2,427,013 | 9/1947 | MacAdams | 356—206 |

RONALD L. WIBERT, Primary Examiner

W. A. SKLAR, Assistant Examiner

U.S. Cl. X.R.

250—206, 212; 356—184, 186, 195